Patented Feb. 4, 1947

2,415,147

UNITED STATES PATENT OFFICE 2,415,147

PROCESS FOR OXIDATION OF HETEROCYCLIC NITROGEN COMPOUNDS

James Ogilvie, Buffalo, and Alvin J. Sweet, East Aurora, N. Y., assignors to Allied Chemical & Dye Corporation, New York, N. Y., a corporation of New York No Drawing. Application August 27, 1942, Serial No. 456,368

6 Claims. (Cl. 260—295.5)

This invention relates to the oxidation of heterocyclic nitrogen compounds containing a pyridine nucleus substituted by an oxidizable organic grouping attached to the nucleus by one or more carbon-to-carbon linkages and capable of being oxidized to a carboxylic group, so as to produce a carboxylic acid, more particularly to the production of nicotinic acid from beta-substituted pyridine compounds.

The present need of plentiful supplies of the vitamin B complex for proper nutritional requirements has greatly increased the importance of producing nicotinic acid, a member of the vitamin B complex. It is known that nicotinic acid can be prepared by oxidation of beta-picoline (3-methyl pyridine) with an aqueous permanganate solution, nitric acid, or a solution of chromic acid in sulfuric acid. However, none of these processes is satisfactory because they are relatively difficult to operate and result in poor yields of nicotinic acid. The processes which utilize strong acids such as nitric or sulfuric acid present substantial corrosion problems which must be overcome by the use of special equipment; furthermore, the use of acid oxidizing media generally tends to cause the nicotinic acid to precipitate from the reaction mixture in association with contaminating insoluble reaction products which render recovery of the nicotinic acid in pure form somewhat difficult. As a result there is a great demand for a simple and effective process for the manufacture, particularly on a commercial scale, of nicotinic acid.

In preparing nicotinic acid by oxidation procedures resulting in the production of an impure aqueous solution thereof, the nicotinic acid is usually separated from the impurities by a procedure involving the formation of copper nicotinate, separation of the copper salt from the remainder of the reaction mixture, and recovery of nicotinic acid therefrom, for example, by converting the copper nicotinate to sodium nicotinate by treatment with sodium hydroxide and acidifying the resulting sodium nicotinate, or by reacting the copper nicotinate with hydrogen sulfide, whereby copper sulfide and nicotinic acid are produced. However, formation of copper nicotinate and its subsequent separation from adhering impurities is expensive and troublesome, especially when practiced on a large scale; furthermore, when nicotinic acid is recovered from copper nicotinate by treatment with hydrogen sulfide, the resulting product is almost always contaminated with sulfur impurities which are extremely undesirable in a product to be used for therapeutic purposes.

It is an object of this invention to provide an improved process for the oxidation of heterocyclic nitrogen compounds containing a pyridine nucleus substituted by an oxidizable organic grouping attached to the nucleus by one or more carbon-to-carbon linkages.

A more specific object of this invention is to provide a simple and practical process for the production of nicotinic acid from beta-picoline.

Another object of this invention is to provide an improved process for the recovery of nicotinic acid from aqueous reaction mixtures containing this material.

In accordance with this invention a heterocyclic nitrogen compound containing in its structure a pyridine nucleus substituted by an oxidizable organic grouping attached to the nucleus by one or more carbon-to-carbon linkages, is oxidized to a carboxylic acid by treatment with a substantially neutral to alkaline aqueous solution of a water-soluble hexavalent chromium compound at a temperature of at least about 150° C. and under a superatmospheric pressure equivalent to the vapor pressure of the reacting mixture at the temperature employed. The desired carboxylic acid product remains in solution in the substantially neutral to alkaline reaction mixture, whereas the chromic oxide simultaneously produced precipitates therefrom and can be removed from the desired product substantially quantitatively by simple means such as filtration, thereby facilitating recovery of the carboxylic acid. The preferred embodiment of our invention involves oxidation of beta-picoline with a substantially neutral to alkaline aqueous solution of a water-soluble hexavalent chromium compound in a closed vessel at a temperature between about 200° and about 250° C. and under the superatmospheric pressure generated in the vessel at the temperature employed by vapors of the reacting mixture; by operating in accordance with this method, excellent yields of the highly valuable nicotinic acid may be readily obtained. Nicotinic acid produced by our invention may, we have found, be recovered from the reaction mixture in a simple and effective manner by reducing the pH value of the mixture to a point between about 3 and about 4, preferably between about 3.2 and about 3.6, e. g. 3.3, and then cooling the reaction mixture whereby nicotinic acid in substantially pure condition separates; this method, it will be noted, avoids the complicated and expensive recovery method heretofore employed involving formation and separation of copper nicotinate and thus greatly simplifies the problem of recovering the valuable nicotinic acid.

The oxidation procedure of our invention proceeds easily to form the desired carboxylic acid in excellent yields. Since the reaction is carried out in a substantially neutral to alkaline medium, no corrosion problems are presented, so that specially constructed equipment need not be employed. In view thereof it is evident our novel procedure provides a greatly simplified oxidation process for the production of valuable pyridine carboxylic acids such as nicotinic acid.

As hereinabove pointed out, our invention is applicable to the oxidation of any heterocyclic nitrogen compound containing in its structure a pyridine nucleus substituted by an oxidizable organic grouping attached to the nucleus by one or more carbon-to-carbon linkages. Thus, for example, the picolines, lutidines, collidines, quinoline and its derivatives such as hydroxyquinolines and quinoline sulfonic acids, isoquinoline, quinaldine, lepidine, and nicotine may all be treated in accordance with our invention. The nature of the product obtained will vary, depending upon the particular compound treated. Thus, for example, oxidation of beta-picoline or nicotine in accordance with this invention yields the highly valuable nicotinic acid; oxidation of alpha-picoline (2-methyl pyridine) yields picolinic acid; oxidation of gamma-picoline (4-methyl pyridine) yields isonicotinic acid. As hereinabove stated, a preferred embodiment of our invention involves the oxidation of beta-picoline since this compound is readily available and at the present time the resulting product, i. e. nicotinic acid, is the most useful of the pyridine carboxylic acids.

The hexavalent chromium compound employed as the oxidizing agent in accordance with our invention may be any one or a compatible mixture of water-soluble hexavalent chromium compounds forming a substantially neutral to alkaline solution in water, but preferably one or more water-soluble salts of chromic acid such as the neutral chromates or polychromates are employed. Water-soluble dichromates, notably sodium, potassium and ammonium dichromate, have been found to be particularly suitable for use in accordance with this invention. However, it is to be understood that water-soluble chromates such as sodium, potassium or ammonium chromate as well as water-soluble tri- or tetrachromates may be employed.

The oxidizing medium, as hereinabove stated, is preferably a substantially neutral to alkaline aqueous solution containing the hexavalent chromium compound to be employed; by "substantially neutral" we intend to include solutions which may show a very weak acid reaction due to the presence of chromic acid. The basic cations present in the aqueous oxidizing solutions are preferably such that water-soluble salts of the pyridine carboxylic acid product are formed by the reaction of the acid and the basic cations; since alkali metal salts of pyridine carboxylic acids are water-soluble, alkali metal salts of hexavalent chromium compounds are preferably employed. Some of the cromic acid salt may be replaced by an equivalent amount of free chromic acid, but there should be a sufficient amount of salts of chromic acid present to maintain the oxiding reagent substantially neutral or alkaline; preferably, chromic salts are present in the oxidizing medium in an amount such that their cations are at least chemically equivalent to the carboxylic acid groups produced by the oxidation, so that salts of the carboxylic acids are obtained.

The amount of hexavalent chromium compound employed may vary, depending upon the heterocyclic nitrogen compound to be oxidized and the number of atoms of hexavalent chromium present in the chromium compound employed. When operating in accordance with the preferred embodiment of our invention, i. e., when oxidizing beta-picoline with an alkali metal dichromate, 1 mol of dichromate per mol of picoline is theoretically required for the oxidation, whereas if a monochromate such as sodium chromate were employed, 2 mols of the hexavalent chromium compound per mol of beta-picoline would be theoretically required. We prefer to employ an amount of the hexavalent chromium compound equivalent to about 50% in excess of the theoretical quantity required for the oxidation, since we have found optimum yields of the desired pyridine carboxylic acid may thereby be obtained.

In accordance with our invention the heterocyclic nitrogen compound to be oxidized is mixed with the substantially neutral to alkaline oxidizing agents and the mixture maintained at a temperature of at least about 150° C., preferably between 200° and 250° C., and at a pressure equivalent to the vapor pressure of the reacting mixture at the temperature employed until the reaction has been substantially completed. The pressure under which the reaction mixture is maintained may be in the neighborhood of from about 5 to about 85 atmospheres. Thus, for example, the reaction may be suitably carried out by disposing the reaction mixture in a high-pressure autoclave and heating the mixture in the autoclave to the desired elevated temperature. The time required for the oxidation may vary but a time between about fifteen and about twenty hours, e. g. seventeen hours, is generally sufficient. In carrying out the reaction the mixture is preferably agitated by suitable agitating means in order to insure maximum contact of the reacting ingredients with one another.

The preferred embodiment of our invention, i. e. oxidation of beta-picoline with an alkali dichromate, may be performed by introducing the beta-picoline and an aqueous dichromate solution containing about 50% dichromate into an autoclave and heating the autoclave to a temperature between about 200° and about 250° C., preferably between about 220° and about 225° C., until oxidation of the beta-picoline has been substantially completed, which may require about seventeen hours. At the end of this time the reaction mixture may be cooled, the pressure relieved and the insoluble chromic oxide formed as a result of the oxidation removed from the reaction mixture by filtration; the chromic oxide should be washed to remove adhering reaction product, the washings being added to the filtrate.

The combined filtrate and washings may then be treated with barium chloride to remove excess chromate and the excess barium removed by reaction with sulfuric acid. The resulting solution is preferably evaporated so as to obtain a solution containing about 10% by weight of nicotinic acid. In accordance with this invention a mineral acid such as hydrochloric acid may then be added to the solution until the pH value thereof is reduced to between about 3 and about 4, preferably between about 3.2 and about 3.6, e. g. about 3.3; upon cooling the thus acidified solution, it will be found, substantially pure nicotinic acid is obtained in excellent yields. The residual nicotinic acid remaining in the solution, whch usually amounts to less than 17% of the total product, may be recovered by the formation of copper nicotinate and conversion thereof to nicotinic acid or by evaporating the residue to dryness and extracting the mass with alcohol to remove the nicotinic acid.

The following example is illustrative of our invention. Amounts are given in parts by weight.

116 parts of beta-picoline, 500 parts of water and 563 parts of sodium dichromate dihydrate were introduced into an autoclave, and the mixture heated with strong agitation at a temperature between 220° and 225° C. for seventeen hours; the pressure within the autoclave during this time as recorded by a gauge was between 320 and 350 pounds per square inch. At the end of the heating period the reaction mass was permitted to cool and then filtered; the chromic oxide filter cake was washed with water, and the washings were admixed with the filtrate. The combined filtrate and washings were then boiled to remove traces of unreacted beta-picoline and 325 parts of barium chloride dihydrate dissolved in 550 parts of water were added to the boiling mass, the precipitated barium chromate being removed by filtration. To the filtrate was added concentrated sulfuric acid until no further barium sulfate precipitate was formed; to the suspension was then added 10 parts of "Filter Cell" and 10 parts of animal charcoal, the mass agitated and then filtered. The filtrate was then made slightly alkaline to Clayton Yellow with sodium hydroxide and evaporated to a point such that the nicotine acid concentration was about 12%. The concentrated solution was then cooled to about 20° C. and 20° Bé. hydrochloric acid added thereto until the pH was reduced to 3.3. This solution was cooled to 0° C. and the nicotinic acid crystals which formed were removed by filtration, washed and dried; the resulting product melted at 229° C. The mother liquor and wash water were combined, concentrated and cooled to about 70° C.; 50 parts of copper sulfate pentahydrate dissolved in 50 parts of water were added thereto and the mass permitted to stand at room temperature for about twelve hours. The copper nicotinate precipitate was removed by filtration, washed and suspended in about 200 parts of water; the suspension was made alkaline with sodium hydroxide and then boiled to precipitate the copper as copper oxide. The oxide was removed by filtration and the filtrate acidified until its pH value was 3.3. This solution was then cooled to 0° C. and nicotinic acid which precipitated was recovered by filtration, washed and dried. Approximately 83% of the nicotinic acid product was recovered at the first crystallization step.

It will be evident from the above description that our invention provides an extremely useful method for the production of pyridine carboxylic acids, particularly the highly valuable nicotinic acid and, hence, will be of great interest to those engaged in the manufacture of such chemicals.

Since certain changes may be made in carrying out the above process without departing from the scope of the invention, it is intended that all matter contained in the above description shall be interpreted as illustrative and not in a limiting sense.

We claim:

1. A process for the oxidation of a heterocyclic nitrogen compound containing in its structure a pyridine nucleus substituted by an oxidizable organic grouping attached to the nucleus by one or more carbon-to-carbon linkages to a carboxylic acid, which comprises reacting said compound with a substantially neutral to alkaline aqueous solution of a water-soluble hexavalent chromium compound at a temperature of at least about 150° C. and under a superatmospheric pressure equivalent to the vapor pressure of the reacting mixture at the temperature employed.

2. A process for the oxidation of a heterocyclic nitrogen compound containing in its structure a pyridine nucleus substituted by an oxidizable organic grouping attached to the nucleus by one or more carbon-to-carbon linkages to a carboxylic acid, which comprises reacting said compound with a substantially neutral to alkaline aqueous solution of a water-soluble hexavalent chromium compound at a temperature between about 200° and about 250° C. and under a superatmospheric pressure equivalent to the vapor pressure of the reacting mixture at the temperature employed, separating the insoluble chromic oxide formed by the oxidation from the remainder of the reaction mixture, and recovering the carboxylic acid.

3. A process for the oxidation of beta-picoline to nicotinic acid which comprises reacting beta-picoline with a substantially neutral to alkaline aqueous solution of a water-soluble hexavalent chromium compound at a temperature between about 200° and about 250° C. and under a superatmospheric pressure equivalent to the vapor pressure of the reacting mixture at the temperature employed.

4. A process for the oxidation of beta-picoline to nicotinic acid which comprises reacting beta-picoline with a substantially neutral to alkaline aqueous solution of an alkali metal dichromate at a temperature between about 200° and about 250° C. and under a superatmospheric pressure equivalent to the vapor pressure of the reacting mixture at the temperature employed, separating the insoluble chromic oxide formed by the reaction from the remainder of the reaction mixture, and recovering nicotinic acid from said reaction mixture.

5. A process for the production of nicotinic acid which comprises reacting beta-picoline with a substantially neutral to alkaline aqueous solution of a water-soluble hexavalent chromium compound at a temperature between about 200° and about 250° C. and under a superatmospheric pressure equivalent to the vapor pressure of the reacting mixture at the temperature employed, separating the insoluble chromic oxide formed by the oxidation from the remainder of the reaction mass; then reducing the pH value of the reaction mixture to between about 3 and about 4, and cooling to effect crystallization of nicotinic acid.

6. A process for the production of nicotinic acid which comprises subjecting beta-picoline to the action of a substantially neutral to alkaline aqueous solution of an alkali metal dichromate at a temperature between about 200° and about 250° C. and under a superatmospheric pressure equivalent to the vapor pressure of the reacting mixture at the temperature employed for about seventeen hours, separating the insoluble chromic oxide formed by the oxidation from the remainder of the reaction mass, removing excess chromate from the reaction mixture by reaction with a barium salt, separating excess barium therefrom by reaction with sulfuric acid, reducing the pH value of the reaction mixture to between about 3.2 and about 3.6 by addition of a mineral acid, and cooling to effect crystallization of nicotinic acid.

JAMES OGILVIE.
ALVIN J. SWEET.

REFERENCES CITED

The following references are of record in the file of this patent:

UNITED STATES PATENTS

| Number | Name | Date |
|---|---|---|
| 2,267,734 | Henke | Dec. 30, 1941 |
| 2,109,954 | Biswell | Mar. 1, 1938 |
| 2,283,991 | Hill | May 26, 1942 |

FOREIGN PATENTS

| Number | Country | Date |
|---|---|---|
| 447,339 | British | |

OTHER REFERENCES

Huber, Ber. 3 p. 849-52 (1870.)
Weiden, Annalen 165 p. 346-50 (1873.)